US008732764B2

(12) United States Patent
Kummer et al.

(10) Patent No.: US 8,732,764 B2
(45) Date of Patent: May 20, 2014

(54) AUTOMATIC RECORDING

(75) Inventors: David A. Kummer, Highlands Ranch, CO (US); Markus Wayne Jackson, Castle Rock, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 939 days.

(21) Appl. No.: 11/948,180

(22) Filed: Nov. 30, 2007

(65) Prior Publication Data

US 2009/0142035 A1  Jun. 4, 2009

(51) Int. Cl.
*H04N 5/445* (2011.01)

(52) U.S. Cl.
USPC .................. 725/58; 725/34; 725/46

(58) Field of Classification Search
USPC .............................. 725/45–46, 58
See application file for complete search history.

(56) References Cited

U.S. PATENT DOCUMENTS

| | | | |
|---|---|---|---|
| 5,867,226 A | 2/1999 | Wehmeyer et al. | |
| 5,955,988 A | 9/1999 | Blonstein et al. | |
| 6,100,886 A | 8/2000 | Lin | |
| 6,216,264 B1 | 4/2001 | Maze et al. | |
| 6,313,873 B1 | 11/2001 | Lee | |
| 6,608,650 B1 | 8/2003 | Torres et al. | |
| 6,772,433 B1 | 8/2004 | LaJoie et al. | |
| 7,444,658 B1 | 10/2008 | Matz et al. | |
| 2001/0037504 A1 | 11/2001 | Lee | |
| 2002/0046407 A1 | 4/2002 | Franco | |
| 2002/0104087 A1 | 8/2002 | Schaffer et al. | |
| 2002/0141348 A1 | 10/2002 | Swix et al. | |
| 2002/0174430 A1* | 11/2002 | Ellis et al. | 725/46 |
| 2003/0020744 A1* | 1/2003 | Ellis et al. | 345/723 |
| 2004/0261112 A1 | 12/2004 | Hicks, III et al. | |
| 2005/0091690 A1* | 4/2005 | Delpuch et al. | 725/88 |
| 2005/0097607 A1 | 5/2005 | Kummer et al. | |
| 2005/0160282 A1 | 7/2005 | Hirata | |
| 2005/0186988 A1* | 8/2005 | Lim et al. | 455/557 |
| 2006/0242665 A1 | 10/2006 | Knee et al. | |
| 2007/0277202 A1 | 11/2007 | Lin et al. | |
| 2007/0288964 A1 | 12/2007 | Horiguchi | |
| 2008/0022305 A1 | 1/2008 | Thompson | |
| 2010/0205636 A1 | 8/2010 | Coburn et al. | |

FOREIGN PATENT DOCUMENTS

| | | |
|---|---|---|
| EP | 1401198 A2 | 3/2004 |
| JP | 2005039748 A | 2/2005 |
| JP | 2007281676 | 10/2007 |
| WO | 2004054259 A1 | 6/2004 |

OTHER PUBLICATIONS

European Search Report for European Patent Publication EP1401198 A2, mailed on Feb. 2, 2009.

(Continued)

*Primary Examiner* — Nicholas Corbo
(74) *Attorney, Agent, or Firm* — Ingrassia Fisher & Lorenz, P.C.

(57) ABSTRACT

A program recording device including an input port, a processor memory, a processor, a selector, and a storage element is configured to receive command data and program data through the input port. The selector receives command data and program data from the input port and outputs the command data to the processor memory and the program data to the storage element. The processor uses this command data to control the selector and storage element to automatically record a program influenced by user preferences onto the storage element without requiring any user input.

24 Claims, 8 Drawing Sheets

(56) References Cited

OTHER PUBLICATIONS

TiVo Inc., TiVo Viewer's Guide, 2002, USA.
Examination Report issued by the European Patent Office in EP application 08 170 017.1-2202 dated May 11, 2010, 5 pages.
Office Action dated May 11, 2010, EP 08170017.1, 5 pages.
Office Action dated May 25, 2011, U.S. Appl. No. 12/370,492, 15 pages.
Amendment and Response to Office Action dated Sep. 23, 2011, 9 pages.
Final Office Action dated Jan. 12, 2012, U.S. Appl. No. 12/370,492, 15 pages.
Amendment and Response to Final Office Action dated Mar. 5, 2012, U.S. Appl. No. 12/370,492, 9 pages.

* cited by examiner

400

Programs UserA will enjoy: 402      Delete?

410 → Title 1     Description 1     ☐

⋮     ⋮     ⋮

412 → Title N     Description N     ☐

Programs UserB will enjoy: 404      Delete?

414 → Title 1     Description 1     ☐

⋮     ⋮     ⋮

416 → Title N     Description N     ☐

Programs UserC will enjoy: 406      Delete?

418 → Title 1     Description 1     ☐

⋮     ⋮     ⋮

420 → Title N     Description N     ☐

Programs you've saved: 408

User:   Delete?

422 → Title A     Description A     A    ☐
424 → Title B     Description B     C    ☐

⋮     ⋮

426 → Title Z     Description Z     B    ☐

Figure 4

UserA preferences:

|  |  | Rank: |
|---|---|---|
| 506 → Genre 1 | Description 1 | ■ 2 3 4 5 |
| ⋮ | ⋮ | ⋮ |
| 508 → Genre N | Description N | 1 2 3 4 ■ |

502

| | Rating: | Allow: | Block: |
|---|---|---|---|
| 510 → | TV Y | ■ | □ |
| 512 → | TV G | ■ | □ |
| 514 → | TV PG | ■ | □ |
| 516 → | TV 14 | ■ | □ |
| 518 → | TV MA | □ | ■ |
| 520 → | G | ■ | □ |
| 522 → | PG | ■ | □ |
| 524 → | R | □ | ■ |

UserA Preferences Questionnaire:

702 → Movies ■

704 → Drama ☐

Action ■

Comedy ■

Foreign ■

Musicals ☐

706 → Game Shows ☐

708 → Sports ■

710 → Baseball ☐

Football ■

712 → Dallas ☐

Denver ■

Basketball ☐

Auto Racing ■

NASCAR ☐

AUTOMATIC RECORDING

BACKGROUND OF THE INVENTION

1. Field of the Invention

This disclosure is related to the field of video broadcasting systems, and in particular, to broadcasting systems configured to automatically record a video program on a user's program recording device.

2. Description of the Prior Art

Digital video recorders (DVRs) and other program recording devices have become valued accessories in many video systems. These devices allow users to record video programs for later viewing (commonly called time-shifting). Users may program their DVRs to record video programming on a particular channel at a given time without further user intervention. This allows users to easily record programs while they are away from their video systems, are asleep, or are otherwise occupied. Users may also program their DVRs to record a series of programs, such as television shows that appear weekly at the same time and channel. This allows users the opportunity to record all of the episodes of their favorite shows without having to be present during the broadcast.

Most DVRs allow users to view a menu of upcoming programming so that they may select which programs to record. On many systems there are a large number of channels (often over 100), each carrying a large number of programs. It may be difficult for users to navigate through these huge menus to select all of the programs which may be of interest to them for recording. Users may not recognize programs which would be of interest to them for a variety of reasons, such as misleading program titles, their appearance on rarely viewed channels, or because the programs are at a later time frame than what is being viewed and so don't appear in the section of the program guide currently visible to the user.

Also, when new programs are created, users may not be aware of their existence until several episodes have passed, and are left trying to catch up to an ongoing series. Special events which are only broadcast once are particularly vulnerable to missed chances for recording. Users may not be aware of the event, or in some cases, like newscasts, there may be no way to schedule the special broadcast in advance since many newsworthy events are not predictable. Also the user may be out of town before or during the event. In these cases, users missing the initial broadcast will most likely never have the chance to view the original, un-edited program.

Broadcasters may also desire to provide programming to a plurality of their users, but allow the users the opportunity to select when to view the program. For example, a satellite television service may produce a program explaining changes to the system that most users will need to view in order to understand the changes. Currently, the provider would need to allocate a channel to the program, and repeatedly broadcast the program to allow users to view it at their convenience. This method uses large amounts of limited broadcast bandwidth.

SUMMARY OF THE INVENTION

A program recording device including an input port, a processor memory, a processor, a selector, and a storage element is configured to receive command data and program data through the input port. The selector receives command data and program data from the input port and outputs the command data to the processor memory and the program data to the storage element. The processor uses this command data to control the selector and storage element to automatically record a program influenced by user preferences onto the storage element without requiring any user input.

BRIEF DESCRIPTION OF THE DRAWINGS

FIG. 4 illustrates a menu in an embodiment of the present invention.

FIG. 5 illustrates a menu in an embodiment of the present invention.

FIG. 7 illustrates a questionnaire in an embodiment of the present invention.

DETAILED DESCRIPTION OF THE PREFERRED EMBODIMENT

Figure 1:
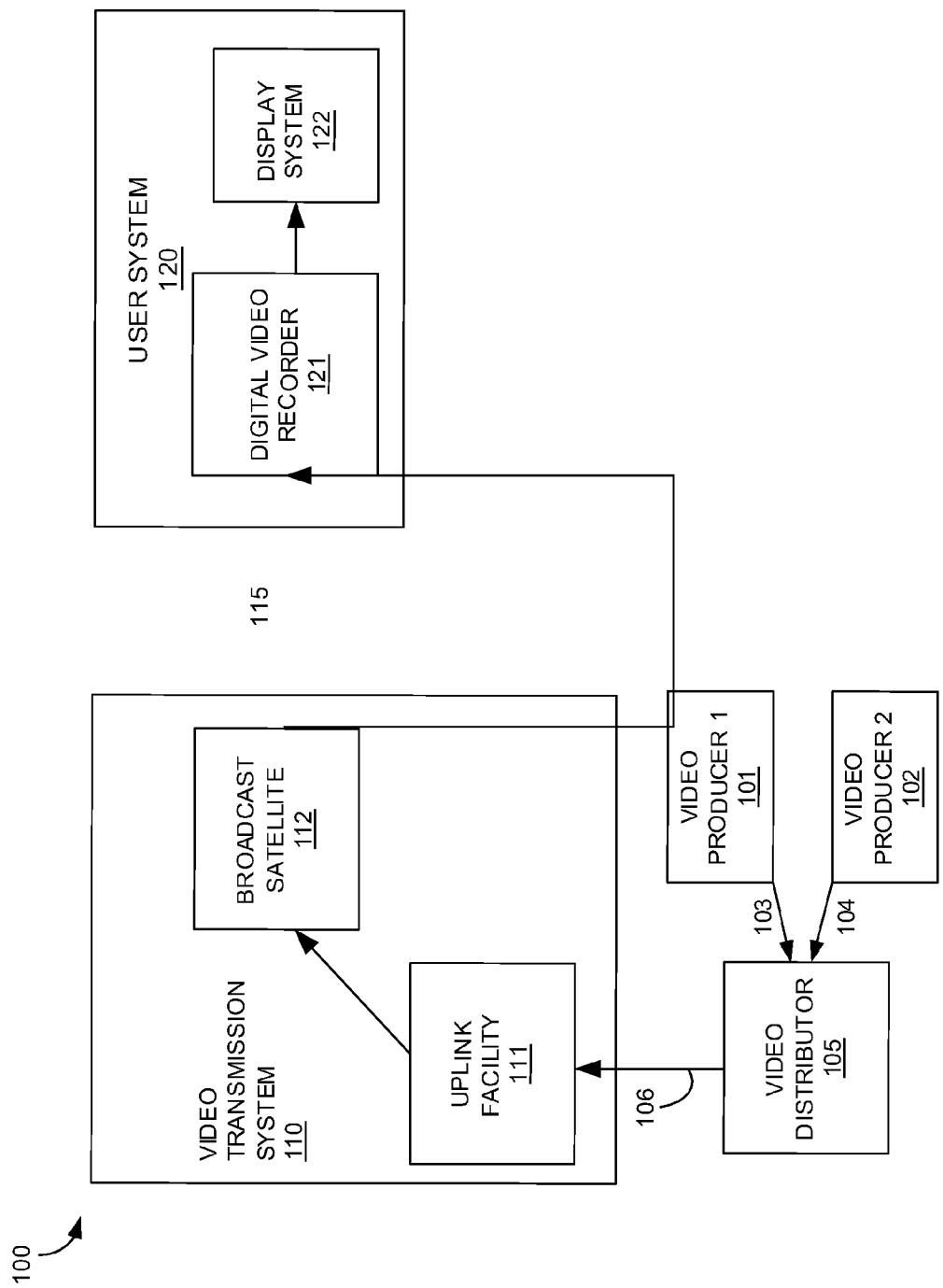
FIG. 1 is a block diagram of a video satellite broadcasting system in an embodiment of the present invention.

FIG. 1 is a block diagram of a video satellite broadcasting system in an embodiment of the present invention. This example embodiment of a video satellite broadcasting system 100 includes a video producer 103, a video distributor 105, a video transmission system 110, and a user system 120. The video transmission system 110 includes an uplink facility 111 and a broadcast satellite 112. The user system 120 includes a program recording device 121 and a display system 122. The program recording device 121 may be a video cassette recorder (VCR), a digital video recorder (DVR), or any other device capable of recording programs under control from command data. The display system 122 may be a television, a computer monitor, or any other display system capable of displaying programs to a user. While this example embodiment includes a satellite broadcast system, any broadcast system may be used within the scope of the present invention.

Figure 2:
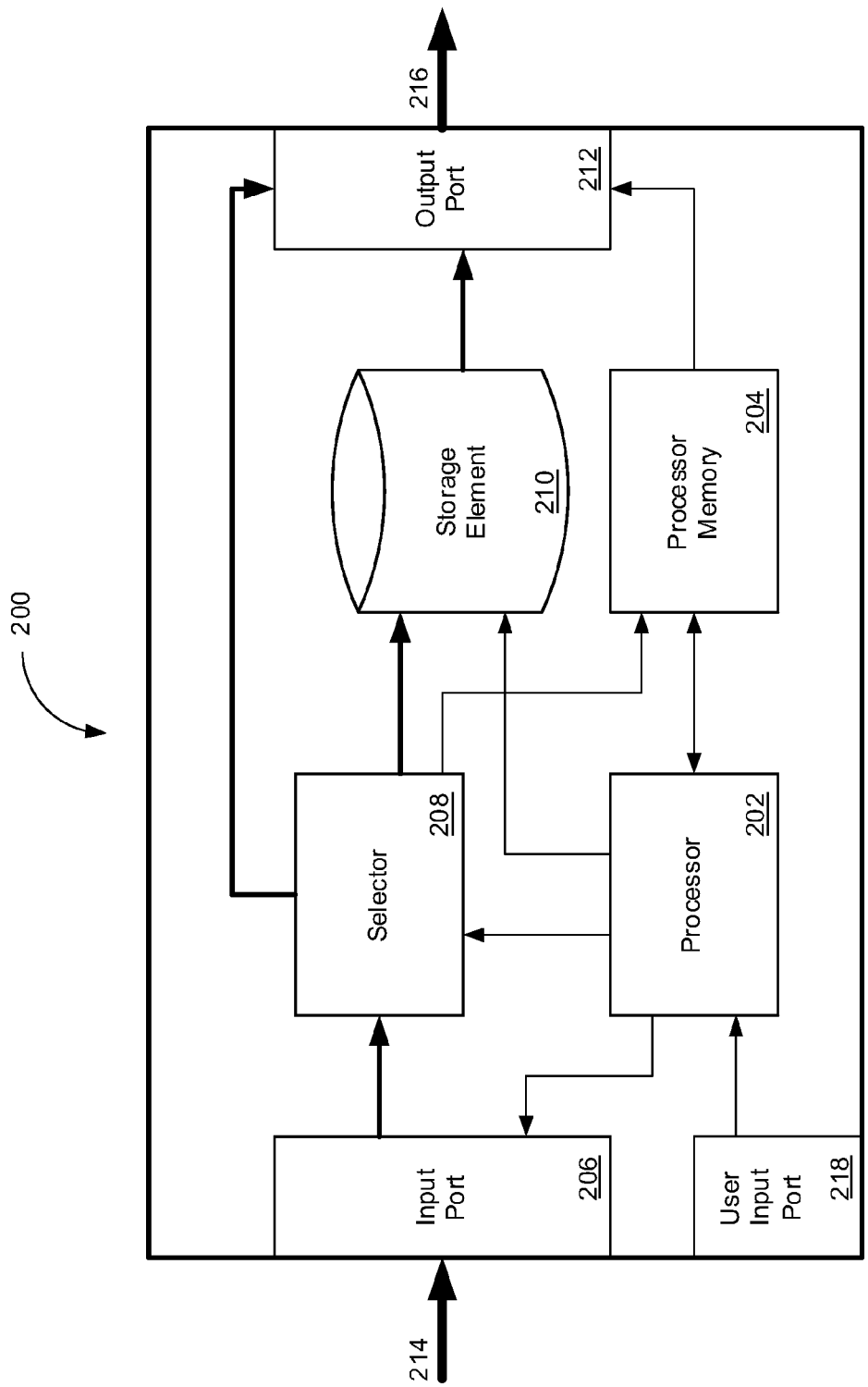
FIG. 2 is a block diagram of a digital video recorder in an embodiment of the present invention.

Video producer 1 101 provides a video product 103 to the video distributor 105. Video producer 2 102 also provides a video product 104 to the video distributor 105. The video distributor 105 provides a plurality of video products 106 to the uplink facility 111, which in turn sends the products to the broadcast satellite 112. The broadcast satellite 112 transmits program data and command data 115 to the user system 120, where it is received by a program recording device 121. The program recording device 121 may be a digital video recorder (DVR) in some embodiments of the present invention. The structure of this program recording device 121 is illustrated in FIG. 2 and described in detail below. The output of the program recording device 121 is then provided to a display system 122, where it may be viewed by a user. This embodiment of the present invention describes a system using program data, which may include video data, audio data, or any other type of broadcast data.

In this example embodiment of the present invention, the video transmission system 110 sends both program data and command data to the user system 120. The program data comprises a plurality of channels, one or more of which may be selected for viewing or recording by the program recording device 121 in the user system 120. The command data is configured to cause the program recording device 121 to automatically record one or more programs from the program data without any input from a user. For example, this command data may include a channel number and a length of time for the recording, or a channel number and a start and stop time for the recording, or a name of a show or episode, or any other program identification data. Those of ordinary skill in the art will recognize that any number of different command data configurations may be used to cause the program recording device 121 to record one or more programs, all within the scope of the present invention.

The command data may be initiated from a number of different sources, all within the scope of the present invention. For example, a video producer 103 may desire to have their video product viewed by a large number of users, and may contract with the video distributor 105 and the owners of the video transmission system 110 to have their product automatically recorded onto the program recording devices 121 of a plurality of users. Alternatively, the video distributor 105 may have one or more programs which they wish to have recorded onto a plurality of users' program recording devices 121, and may contract with the owners of the video transmission system 110 to have their programs automatically recorded onto the program recording devices 121 of a plurality of users. Likewise, the owners of the video transmission system 110 may have program data that they wish to have recorded onto a plurality of users' program recording devices 121 and may broadcast the appropriate control signals to accomplish this task. This program data may take the form of advertisements directed at a multitude of users. In these cases, the video producers 101 and 102, the video distributor 105, or the owners of the video transmission system 110 may be acting as advertisers, sending advertisements to potential customers through their program recording devices 121.

In some example embodiments of the present invention, the command data from the broadcast satellite 112 may interact with the program recording device 121, such that the user may influence which programs, or types of programs, are recorded onto their program recording device 121. This interaction is illustrated by the menus in FIGS. 3 through 6, and described in detail below.

FIG. 2 is a block diagram of a digital video recorder in an embodiment of the present invention. This example digital video recorder (DVR) 200 functions as the program recording device 121 from FIG. 1, and includes a processor 202, processor memory 204, a selector 208, an input port 206, a storage element 210, and an output port 212. Optionally, it may include a user input port 218 coupled to the processor 202. The input port 206 receives command and program data 208, and communicates this data to the selector 208. The input port 206 may also be configured to select a frequency (or band of frequencies) from a plurality of frequencies for reception. This frequency selection may be controlled by the processor 202. For example, in systems receiving transmissions from more than one satellite, or on more than one frequency, the input port may be configured to select a single frequency from the group of frequencies that are received. The selector 208 is configured to select a channel from the program data and communicate the program on the selected channel to the storage element 210, and the output port 212. Channels may be multiplexed on a single frequency in any of several different methods well known in the art. The selector 208 is also configured to send the command data to the processor memory 204 for use by the processor 202. The processor 202 receives command data from the processor memory 204 and sends control data to the channel selector 208 and the input port 206. The processor 202 also is configured to communicate with the processor memory 204 to store and retrieve command data and menu data. The storage element 210 is configured to receive program data from the selector 208 and to send program data to the output port 212. The processor memory 204 is also configured to send menu data to the output port 212. The user input port 218 is configured to send command data to the processor 202, and in some embodiments may include a receiver for signals from a remote control (not shown). Optionally, some embodiments may allow command data from the user input port 218 to override or qualify command data received by the input port 206. The output port 212 is configured to send video data and menu data 216 to a display system 122.

In an example embodiment, the processor 202 receives command data from a video transmission system 110 containing commands directing the DVR 200 to record one or more programs onto the storage element 210. Command data may be received separately or with program data. Also, command data may be received at different time than program data is received. Those of ordinary skill in the art will recognize that a wide variety of processors are available for use in this function. The processor 202 may be hardware, or a combination of hardware and software, all within the scope of the present invention. In response to the command data, the processor 202 then sends control data to the selector 208, directing it to select a particular channel at a particular time, and for a particular length of time, and to the input port 206, directing it to select a particular frequency at a particular time, and for a particular length of time. The processor 202 also sends control signals to the storage element 210 directing it to record the program sent to it by the selector 208. In some embodiments, the processor 202 may also be configured to disable "trick" modes in the DVR 200 during any playback of the program from the storage element 210. These "trick" modes may include fast-forwarding, skip, slow motion, pause, or any other mode normally available on the DVR, that the provider of the program does not wish the user to use during playback of the program. Those of skill in the art will recognize that there are a wide variety of devices currently available configurable as the storage element 210 in a DVR 200. Devices such as hard drives, static RAM, flash memory, or any other such non-volatile storage devices may be configured as a storage element 210, all within the scope of the present invention.

In other embodiments of the present invention, the command data may interact with user data stored in the processor memory 204 to modify which programs are selected for automatic recording. For example, the system may select one or more programs from a plurality of programs for recording based on a user's past recording habits, thus indicating a user's preference for various programs. Other embodiments may consider a user's preferences for different program genres or ratings. Examples of relating the programs selected for automatic recording based on data from a user are illustrated in FIGS. 3 through 6 and described in detail below.

Figure 3:
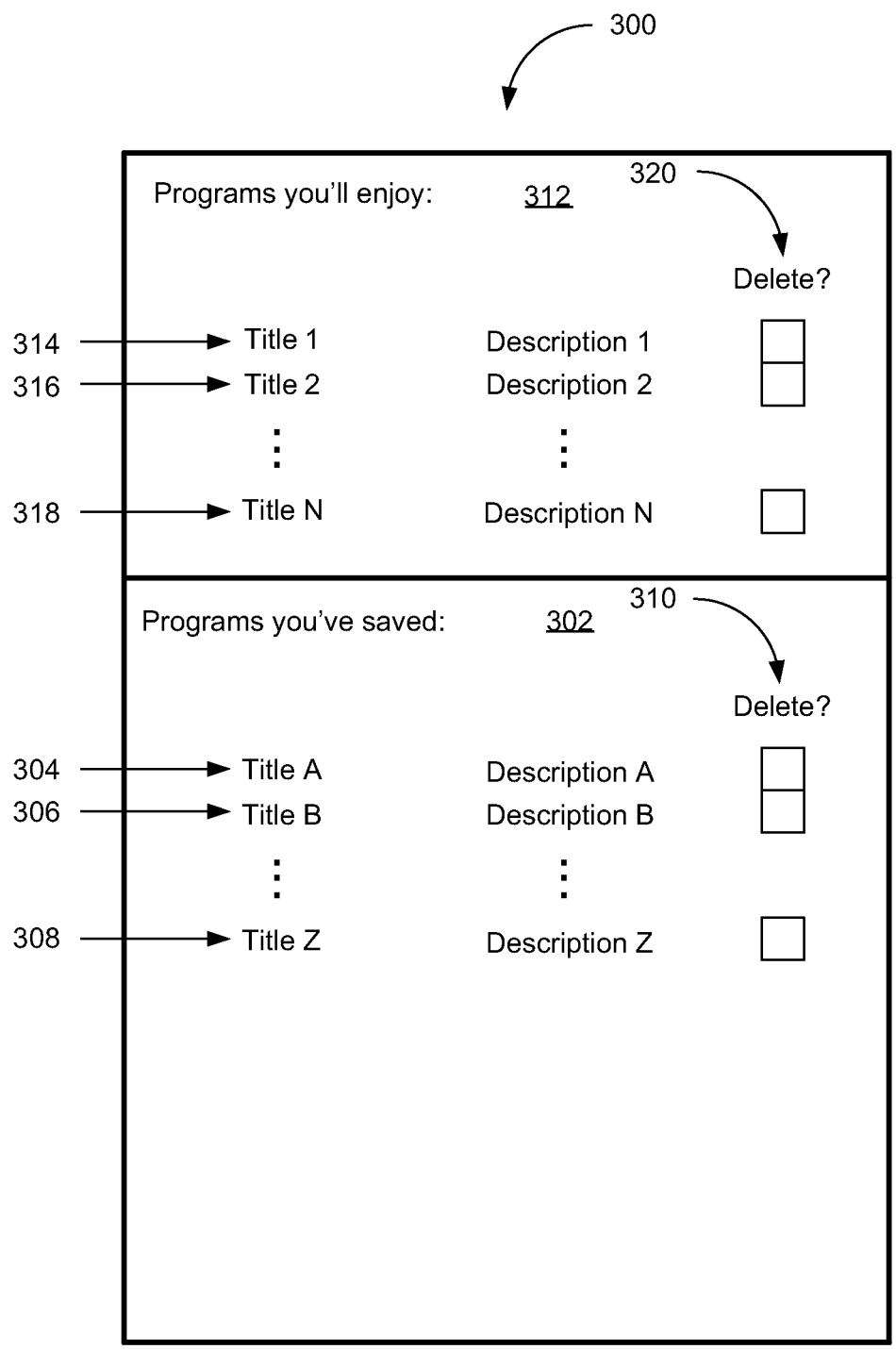
FIG. 3 illustrates a menu in an embodiment of the present invention.

FIG. 3 illustrates a menu in an embodiment of the present invention. In this example, a user is presented with a menu 300 having two segments by way of the display system 122 of FIG. 1. A first segment 302 contains a list of programs that a user has previously recorded on the DVR 200. In this example, a first program 304 having a title and description, a second program 306 having a title and description, and a Z-th program 308 having a title and description are shown in this first segment 302 of the menu 300.

A second segment 312 contains a list of programs that have been automatically recorded on the DVR 200, or in other embodiments, a list of programs scheduled for automatic recording by the DVR 200. Still other embodiments may contain a list including both programs scheduled for automatic recording and programs already automatically recorded by the DVR 200. In this example, a first automatically recorded program 314 having a title and description, a second automatically recorded program 316 having a title and description, and an N-th automatically recorded program 318 having a title and description are shown in this second segment 312 of the menu 300. In this example, the user is also presented with a column of control elements allowing the deletion of any of the user recorded programs in the first segment 310 of the menu, along with a column of control elements allowing the deletion of any of the automatically recorded programs in the second segment 312 of the menu 300. In some embodiments, the DVR 200 is configured to automatically record one or more programs influenced by the list of programs that the user has previously recorded. In other embodiments of the present invention, the display order of these automatically recorded programs may be controlled by the command data, and the display order may also be influenced by the preferences of the user. Those of skill in the art will recognize that there are a wide variety of methods for allowing the selection of programs to record to be influenced by a user's previous recordings, all within the scope of the present invention. In some embodiments of the present invention, if the programs scheduled for automatic recording have not yet been recorded, the user is presented with a list of programs scheduled for automatic recording. The user may then be given the option of not recording one or more of the programs scheduled for automatic recording.

FIG. 4 illustrates a menu in an embodiment of the present invention. In this example, a DVR 200 used by a plurality of viewers is configured to automatically record different programs which may be of interest to different users. For example, a DVR 200 may be used by three different users who each have different tastes in programming. Here, a menu 400 is presented to the users has four segments. A first segment 408 includes a list of programs that have been saved by the three different users. This first segment 408 includes a first program 422 having a title, a description, and a user name, a second program 424 having a title, a description, and a user name, and a Z-th program 426 having a title, a description, and a user name. In this example, UserA has recorded the first program 422, UserC has recorded the second program 424, and UserB has recorded the Z-th program 426. In response to command data from the video transmission system 110, the DVR 200 has recorded one or more programs for each of the three users. In a second segment 402 of the menu 400, a first UserA automatically recorded program 410 through an N-th UserA automatically recorded program 412 are shown. In a third segment 404 of the menu 400, a first UserB automatically recorded program 414 through an N-th UserB automatically recorded program 416 are shown. In a fourth segment 406 of the menu 400, a first UserC automatically recorded program 418 through an N-th UserC automatically recorded program 420 are shown. In this example, the programs automatically recorded for each of the users are influenced by the programs previously recorded by each of the users. Those of ordinary skill in the art will recognize that there are a wide variety of methods available to allow the selection of programs to record to be based on more than one user's previous recordings, all within the scope of the present invention. In some embodiments of the present invention, more than one user may be associated with a single program that has been previously recorded. In other embodiments, an automatically recorded program may be listed for more than one user, all within the scope of the present invention.

FIG. 5 illustrates a menu in an embodiment of the present invention. In this example, a user is provided with a menu 500 allowing the user to rank different genres of programs in a first segment 502, and to select different program ratings to allow or block programs in a second segment 504. The first segment 502 includes a list of one or more genres of programs and user inputs allowing a user to rank them in order of preference. In this example, a first genre 506 has been given a ranking of "1" by UserA, and an N-th genre 508 has been given a ranking of "5" by UserA. Those of ordinary skill in the art will recognize that there are a wide variety of methods to categorize programs by genre, and to rank genres, all within the scope of the present invention. In this example, UserA has rated Genre 1 higher than Genre N, and so the automatic recording of programs would be influenced by these ratings. For example, programs falling into Genre 1 would be more likely to be automatically recorded than programs falling into Genre N. This relationship between genre rankings and the selection of programs for automatic recording may be accomplished by a wide variety of methods, all within the scope of the present invention. Genres may include categories such as movies, sports, television series, music, news, and children's programming. In some cases, these genres may include subcategories. For example, the sports genre may include a number of subcategories such as football, baseball, basketball, and rugby. Also, the subcategories may include particular teams that are of special interest to the user. Those of ordinary skill in the art will recognize that there are a wide variety of genres and subcategories possible, all within the scope of the present invention. User preferences may also be determined by way of a questionnaire such as that shown in FIG. 7 and described below.

The second segment 504 of the menu 500, includes a list of program ratings and movie ratings and allows the user to selectively allow or block programs for each rating. In this example, program ratings of TV-Y 510, TV-G 512, TV-PG 514, TV-14 516, TV-MA 518, movie G 520, movie PG 522, and movie R 524 are shown. However, any other ratings or rating systems may be used within the scope of the present invention. In this example embodiment, UserA has decided to block programs with ratings of TV-MA and movie R, and to allow all other ratings to be automatically recorded. Similar to the genres, program ratings may include a quantity of subcategories. For example, program ratings may include designations indicating the presence of violence or nudity within a program. Other embodiments of the present invention may allow the user to selectively block or allow programs based on these subcategories. Those of ordinary skill in the art will recognize that there are a wide variety of possible rating systems and subcategories possible, all within the scope of the present invention.

Figure 6:
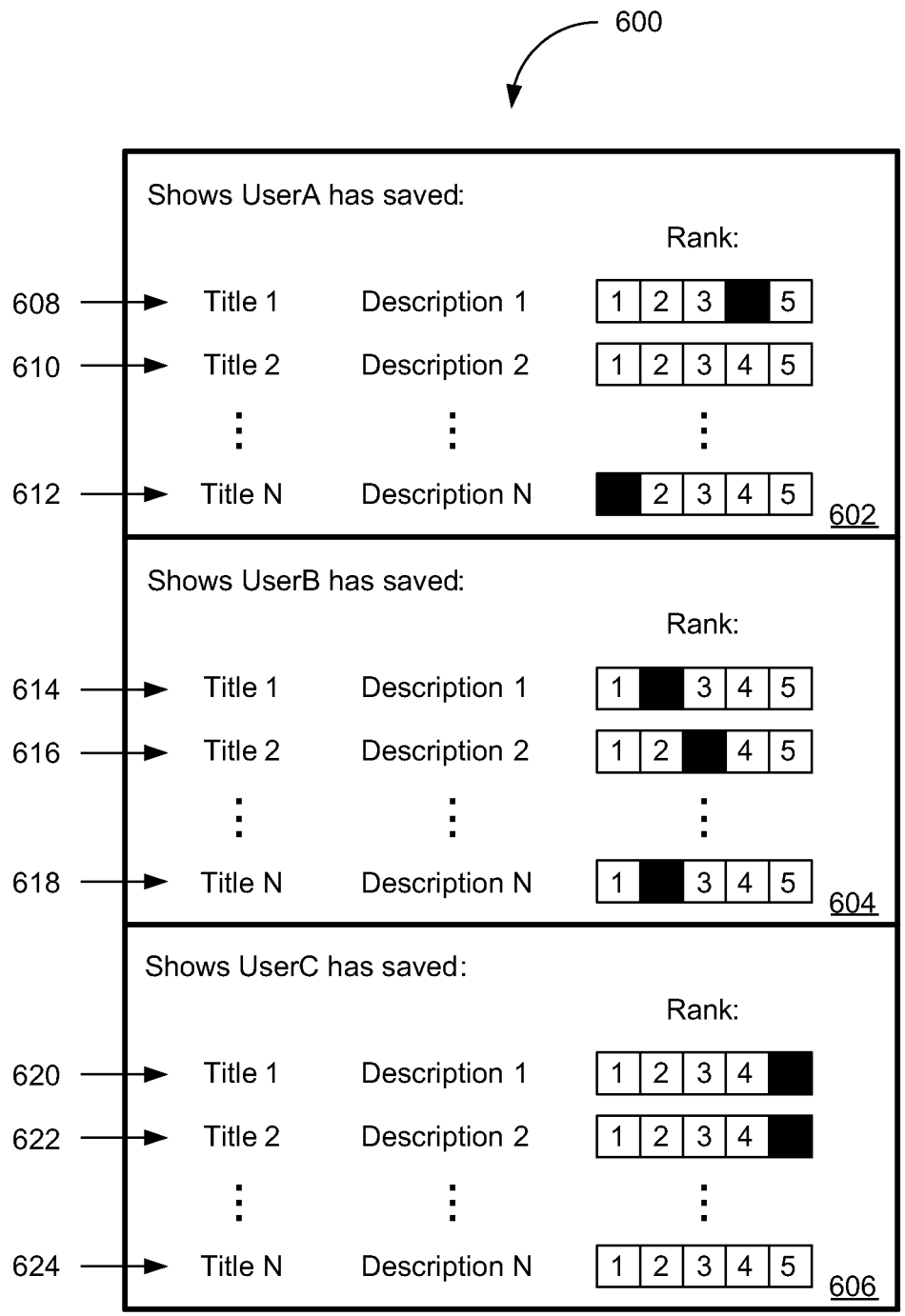
FIG. 6 illustrates a menu in an embodiment of the present invention.

FIG. 6 illustrates a menu in an embodiment of the present invention. In this example, a plurality of users are given the opportunity to rate a plurality of previously recorded programs in order to influence the future automatic recording of programs. This example menu 600 has three sections, one for each of three users. In a first segment 602 of the menu, UserA is given the opportunity to rate each of a plurality of previously recorded programs. In this example, UserA has rated Title 1 608 a "4", has not rated Title 2 610, and has rated Title N 612 a "1." In a second segment 604 of the menu, UserB is given the opportunity to rate each of a plurality of previously recorded programs. In this example, UserB has rated Title 1 614 a "2", has rated Title 2 616 a "3", and has rated Title N 618 a "2." In a third segment 606 of the menu, UserC is given the opportunity to rate each of a plurality of previously recorded programs. In this example, UserC has rated Title 1 620 a "5", has rated Title 2 622 a "5", and has not rated Title N 624. These ratings may then be used to relate to the programs automatically recorded for each user. Those of ordinary skill in the art will recognize that there are a wide variety of methods for users to rate programs, and a wide variety of methods to relate these ratings to the selection of programs for automatic recording, all within the scope of the present invention. Other embodiments may have different numbers of users and different rating systems, all within the scope of the present invention.

FIG. 7 illustrates a questionnaire in an embodiment of the present invention. In this example embodiment, a user is presented with a questionnaire regarding genres, sub-genres, and sub-sub-genres. A menu 700 presents the user with a selection of genres, sub-genres, and sub-sub-genres. For example, a first genre 702 is movies, while a first sub-genre 704 is drama. A second genre 706 is game shows, while a third genre 708 is sports. A second sub-genre 710 is baseball, while a sub-sub-genre 712 is Dallas. In this example, the user has expressed interest in the first sub-genre 702, movies, while showing no interest in the first sub-genre 704, drama. Since the user has shown no interest in the second genre 706, game shows, there is no need for the questionnaire to display any game show sub-genres or sub-sub-genres to the user. In this example, the user has shown interest in the third genre 708, sports, and the second sub-genre 710, baseball. The user has also indicated interest in the sub-genre, football, and has also shown no interest in the sub-sub-genre 712 related to football, Dallas. In this case, the user is showing interest in a football team from Denver, while showing no interest in a football team from Dallas. This allows the user to record preferences related to specific sports teams, or other specific classes of programming, such as an individual television series. Those of skill in the art will recognize that there are a very wide variety of methods available to categorize genres, and all of their sub-genres. While the example questionnaire shown in FIG. 7 shows three levels of increasing specificity, other embodiments may use a greater or lesser level of complexity in the questionnaire, all within the scope of the present invention.

Figure 8:
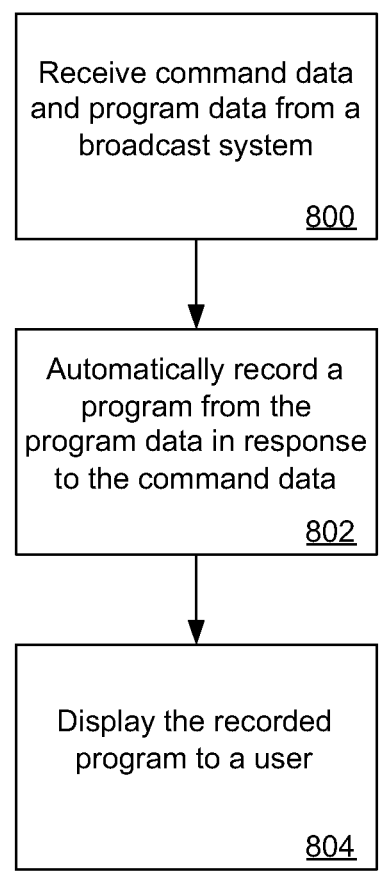
FIG. 8 is a flow chart of a method of automatically recording a program in an embodiment of the present invention.

FIG. 8 is a flow chart of a method of automatically recording a program in an embodiment of the present invention. In an operation 800, program data and command data is received from a broadcast system. In an operation 802, a program from the program data is automatically recorded in response to the command data. In an operation 804, the program is displayed to a user. In an embodiment of the present invention, the program automatically recorded is influenced by previously recorded programs, such as those shown in FIGS. 3, 4, and 6. In another embodiment of the present invention, the program automatically recorded is influenced by user preferences, such as those shown in FIGS. 5 and 7. In a further embodiment of the present invention, the program automatically recorded is influenced by user program rating requirements, such as those shown in FIG. 5.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A program recording device, comprising:
a storage element;
a processor memory;
a processor coupled with the storage element and the processor memory;
a selector coupled with the storage element, the processor, and the processor memory; and
an input port coupled with the selector and the processor;
wherein the selector is configured to receive command data and program data, output the command data to the processor memory, and output the program data to the storage element;
wherein the program data contains a plurality of channels, one or more of which may be selected for viewing or recording by the program recording device;
wherein the command data contains a plurality of commands each of which directing the program recording device to automatically record a program, each command of the plurality of commands comprising a channel number and a length of time for the program, or a channel number and a start and stop time for the program, or a name of a show or episode for each of a plurality of programs, wherein the command data contains the plurality of commands each of which directing the program recording device to automatically record the program without any input from a user; and
wherein the processor receives the command data from the processor memory and operates the selector, the input port, and the storage element to automatically select, without receiving a command from the user, a first program of the plurality of programs based on user preferences that are stored in the storage element and the command data and record the first program, in response to the command data, and to automatically select, without receiving a command from the user, a second program of the plurality of programs based on the user preferences and the command data and not record the second program, thereby automatically overriding the command data based on the user preferences;
wherein the command data and the program data are both received from a transmission or broadcast system.

2. The program recording device of claim 1, wherein the command data comprises: a channel; and a start time.

3. The program recording device of claim 2, wherein the command data further comprises: a stop time.

4. The program recording device of claim 1, wherein the command data comprises: a program identification.

5. The program recording device of claim 1, wherein the user preferences are influenced by other programs previously recorded by a user.

6. The program recording device of claim 1, wherein the user preferences are genre preferences of a user.

7. The program recording device of claim 1, wherein the user preferences are rating preferences of a user.

8. The program recording device of claim 1, wherein one of the first and the second programs is selected by an advertiser.

9. The program recording device of claim 1, wherein the command data also comprises disabling a trick mode in the program recording device.

10. The program recording device of claim 1, further comprising:
a user input port coupled to the processor;
wherein the user input port is configured to receive user command data from a user, and send the user command data to the processor; and
wherein the user command data is able to override the command data.

11. The program recording device of claim 1, wherein the processor memory is configured to store a list of programs scheduled for automatic recording.

12. The program recording device of claim 11, wherein the processor is configured to place a program scheduled for automatic recording at a location within the list of programs based upon the command data.

13. The program recording device of claim 11, wherein the processor memory is also configured to store a list of programs previously recorded.

14. The program recording device of claim 11, wherein the processor memory is also configured to store the user preferences.

15. The program recording device of claim 1, further comprising:
a user input port coupled with the processor; and
an output port coupled with the storage element and the selector.

16. The program recording device of claim 1,
wherein the selector is configured to select between the plurality of channels, and output program data from the selected channel to the storage element.

17. The program recording device of claim 1, wherein the program data and command data are received at different times.

18. An automatic program recording system, comprising:
a transmission system, configured to broadcast command data and program data, the command data containing a plurality of commands each of which directing a user system to record a program, each command of the plurality of commands comprising a channel number and a length of time for the recording, or a channel number and a start and stop time for the recording, or a name of a show or episode for each of a plurality of programs and the program data containing a plurality of channels, one or more of which may be selected for viewing or recording by a program recording device; and
the user system, configured to receive the command data and the program data from the transmission system, comprising:
a display; and
the program recording device coupled with the display, configured to:
receive the command data and the program data from the transmission system, wherein the command data contains commands directing the program recording device to automatically record the program without any input from a user;
select a first program of the plurality of programs based on user preferences that are stored in the program recording device and based on the command data;
record the selected first program from the program data in response to the command data;
select a second program of the plurality of programs based on the user preferences and based on the command data;
not record the selected second program from the program data, thereby automatically overriding the command data based on the user preferences; and
output the first program to the display.

19. The automatic program recording system of claim 18, wherein the program recording device is a digital video recorder.

20. The automatic program recording system of claim 18, wherein the program recording device comprises: a storage element configured to store programs.

21. A method for automatically recording a program, comprising:
receiving command data and program data from a broadcast system, the command data containing a plurality of commands each of which directing a program recording device to record a program, each command of the plurality of commands comprising a channel number and a length of time for the recording, or a channel number and a start and stop time for the recording, or a name of a show or episode for each of a plurality of programs, wherein the command data contains the plurality of commands each of which directing the program recording device to automatically record the program without any input from a user, the program data containing a plurality of channels, one or more of which may be selected for viewing or recording by the program recording device;
selecting a first program of the plurality of programs based on user preferences that are stored in the storage element and based on the command data;
automatically recording the first program in response to the command data;
selecting a second program of the plurality of programs based on user preferences that are stored in the storage element and based on the command data;
not recording the second program, thereby automatically overriding the command data based on the user preferences; and
displaying the program to a user.

22. The method for automatically recording a program of claim 21, wherein the user preferences are indicated by previously recorded programs.

23. The method for automatically recording a program of claim 21, wherein the user preferences are genre preferences of the user.

24. The method for automatically recording a program of claim 21, wherein the user preferences are rating preferences of the user.

* * * * *